(12) United States Patent
Li et al.

(10) Patent No.: US 12,517,860 B2
(45) Date of Patent: Jan. 6, 2026

(54) COMMUNICATION METHOD AND SYSTEM BASED ON DEPLOYMENT RELATIONSHIP BETWEEN MULTIPLE PROCESSORS

(71) Applicant: HANGZHOU ALICLOUD FEITIAN INFORMATION TECHNOLOGY CO., LTD., Hangzhou (CN)

(72) Inventors: Hao Li, Beijing (CN); Jianbo Dong, Beijing (CN); Zhongqi An, Beijing (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,210

(22) PCT Filed: Jan. 30, 2023

(86) PCT No.: PCT/CN2023/073763
§ 371 (c)(1),
(2) Date: Feb. 20, 2024

(87) PCT Pub. No.: WO2023/143595
PCT Pub. Date: Aug. 3, 2023

(65) Prior Publication Data
US 2025/0004980 A1   Jan. 2, 2025

(30) Foreign Application Priority Data
Jan. 30, 2022  (CN) .......................... 202210114722.4

(51) Int. Cl.
*G06F 15/16* (2006.01)
*G06F 15/173* (2006.01)

(52) U.S. Cl.
CPC .. *G06F 15/17306* (2013.01); *G06F 15/17337* (2013.01)

(58) Field of Classification Search
CPC ......... G06F 15/17306; G06F 15/17337; G06F 15/163
See application file for complete search history.

(56) References Cited

U.S. PATENT DOCUMENTS

| | | | |
|---|---|---|---|
| 2008/0316888 A1* | 12/2008 | Reifman | H04M 1/575 704/235 |
| 2011/0314496 A1* | 12/2011 | Di Mattia | H04N 21/2362 725/36 |

(Continued)

FOREIGN PATENT DOCUMENTS

| | | |
|---|---|---|
| CN | 101631110 A | 1/2010 |
| CN | 106326143 A | 1/2017 |

(Continued)

OTHER PUBLICATIONS

International Search Report dated Apr. 13, 2023, in connection with International Application No. PCT/CN2023/073763.

(Continued)

*Primary Examiner* — Razu A Miah
(74) *Attorney, Agent, or Firm* — Wolf, Greenfield & Sacks, P.C.

(57) ABSTRACT

A communication method and system based on deployment relationship between multiple processors are provided. In the method, a first processor obtains at least one piece of target identification information to be queried; and determines a second processor corresponding to the target identification information, wherein the second processor is used for obtaining a target query result corresponding to the target identification information. In addition, in response to that the deployment relationship between the first and second processors being that the first and second processors are deployed on the same physical machine or on different physical machines, the first processor determines that a target communication mode for the second processor is that (Continued)

the communication is performed through a bus or through network respectively. Then, the first processor sends the target identification information to the second processor through the target communication mode.

16 Claims, 6 Drawing Sheets

(56) References Cited

U.S. PATENT DOCUMENTS

| | | | | |
|---|---|---|---|---|
| 2012/0079134 | A1* | 3/2012 | Outhred | H04L 12/4633 |
| | | | | 709/244 |
| 2013/0138686 | A1* | 5/2013 | Takahashi | G06F 16/2471 |
| | | | | 707/769 |
| 2015/0365325 | A1* | 12/2015 | Hwang | H04L 47/12 |
| | | | | 370/230 |
| 2016/0246652 | A1* | 8/2016 | Herdrich | G06F 9/5077 |
| 2017/0093742 | A1* | 3/2017 | Cropper | G06F 9/5077 |
| 2017/0339573 | A1* | 11/2017 | Yamada | H04W 16/04 |
| 2018/0167227 | A1* | 6/2018 | Schmitz | H04L 65/403 |
| 2018/0316636 | A1* | 11/2018 | Kamat | H04L 51/046 |
| 2019/0045251 | A1* | 2/2019 | Shen | H04L 65/1066 |
| 2019/0050567 | A1* | 2/2019 | Chistyakov | G06F 21/566 |
| 2019/0289042 | A1* | 9/2019 | Perreault | H04L 65/403 |
| 2020/0403987 | A1* | 12/2020 | Mitchell | H04L 63/0823 |
| 2021/0377185 | A1* | 12/2021 | Durrani | H04L 47/801 |
| 2025/0004980 | A1* | 1/2025 | Li | G06F 15/17337 |

FOREIGN PATENT DOCUMENTS

| | | |
|---|---|---|
| CN | 108694092 A | 10/2018 |
| CN | 111078415 A | 4/2020 |
| CN | 113157609 A | 7/2021 |
| CN | 113420191 A | 11/2021 |
| CN | 113657577 A | 11/2021 |
| CN | 114579506 A | 6/2022 |
| JP | 2011238132 | * 11/2011 |

OTHER PUBLICATIONS

Chinese Office Action dated Jul. 26, 2024, in connection with Chinese Application No. 202210114722.4, with English translation thereof.

* cited by examiner

COMMUNICATION METHOD AND SYSTEM BASED ON DEPLOYMENT RELATIONSHIP BETWEEN MULTIPLE PROCESSORS

The present application is a national stage filing under 35 U.S.C. 371 of International Patent Application Serial No. PCT/CN2023/073763, filed Jan. 30, 2023, entitled "METHOD AND SYSTEM FOR COMMUNICATION BETWEEN PROCESSORS, STORAGE MEDIUM, AND PROCESSOR", which claims priority to a Chinese patent application No. 202210114722.4, filed with the China Patent Office on Jan. 30, 2022 and entitled "METHOD AND SYSTEM FOR COMMUNICATION BETWEEN PROCESSORS, STORAGE MEDIUM, AND PROCESSOR". The entire contents of these applications are incorporated herein by reference in their entirety.

TECHNICAL FIELD

The present invention relates to the field of communication between processors, and specifically to a method and a system for communication between processors, a storage medium, and a processor.

BACKGROUND

Currently, in a process of training a prediction model, frequent distributed table lookup operations are required, and a core query step thereof is implemented through AllToAllV (a synchronized communication primitive involving multiple parties). The performance of AllToAllV itself plays an important role in the entire training process. With the widespread use of heterogeneous acceleration hardware such as processors in the field of deep learning, the performance of AllToAllV may be achieved through communication among a plurality of processors. However, a low efficiency of communication among a plurality of processors as currently employed results in poor performance of AllToAllV and thereby low query efficiency.

For the above problem, an effective solution has not yet been proposed.

SUMMARY

Embodiments of the present invention provide a method and system for communication between processors, a storage medium, and a processor, in order to at least solve the technical problem that the query efficiency of querying the target identification information is reduced due to low efficiency of communication between the processors.

According to an aspect of the embodiments of the present invention, there is provided a method for communication between processors, comprising: obtaining, by a first processor, at least one piece of target identification information to be queried; determining, by the first processor, a second processor corresponding to the at least one piece of target identification information, wherein the second processor is used for obtaining a target query result corresponding to the at least one piece of target identification information: determining, by the first processor, a target communication mode for the second processor based on a deployment relationship between the first processor and the second processor, wherein the deployment relationship is used for indicating whether the first processor and the second processor are deployed on a same physical machine: sending, by the first processor, the at least one piece of target identification information to the second processor through the target communication mode.

According to another aspect of the embodiments of the present invention, there is provided a system for communication between processors, comprising: a first processor, used for obtaining at least one piece of target identification information to be queried; and a second processor, communicating with the first processor through a target communication mode, and used for obtaining a target query result corresponding to the at least one piece of target identification information, wherein the target communication mode is determined by a deployment relationship between the first processor and the second processor, and the deployment relationship is used for indicating whether the first processor and the second processor are deployed on a same physical machine.

According to another aspect of the embodiments of the present invention, there is provided a storage medium, comprising a stored program, wherein the program, when running, controls a device where the storage medium is located to execute any one of the above methods for communication between processors.

According to another aspect of the embodiments of the present invention, there is provided a processor, used for running a program, wherein the program, when running, executes any one of the above methods for communication between processors.

In the embodiments of the present invention, first, a first processor may obtain at least one piece of target identification information to be queried: the first processor determines a second processor corresponding to the at least one piece of target identification information, wherein the second processor is used for obtaining a target query result corresponding to the at least one piece of target identification information: the first processor determines a target communication mode for the second processor based on a deployment relationship between the first processor and the second processor, wherein the deployment relationship is used for indicating whether the first processor and the second processor are deployed on the same physical machine; and the first processor sends the at least one piece of target identification information to the second processor through the target communication mode, so as to improve query efficiency by improving communication speed between the processors. It is easy to notice that by means of the target communication mode for the second processor as determined by the deployment relationship between the first processor and the second processor, communication links in physical machines may be fully utilized to communicate the processors located in the same physical machine, thereby improving the speed of communication between the processors in the same physical machine. Meanwhile, it is possible to alleviate occupancy of network resources among different physical machines, thereby improving the communication speed of processors located among different physical machines, and then solving the technical problem in the related art that the query efficiency of querying the target identification information is reduced due to low efficiency of communication between the processors.

BRIEF DESCRIPTION OF THE DRAWINGS

The drawings described herein are used to provide a further understanding of the present invention, and constitute a part of the present application. The illustrative embodiments of the present invention and descriptions thereof are used to explain the present invention, and do not constitute an improper limitation of the present invention. In the drawings.

DETAILED DESCRIPTION

Figure 1:
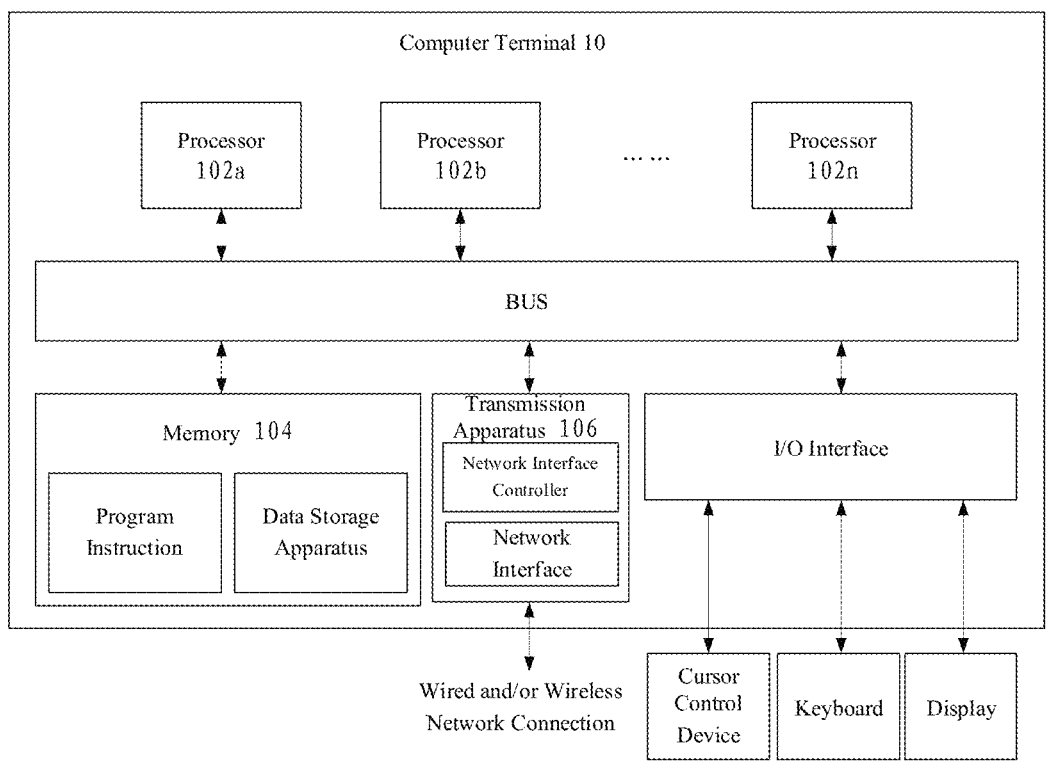
FIG. 1 is a hardware structural block diagram of a computer terminal (or a mobile device) for implementing a method for communication between processors according to an embodiment of the present invention.

In order to enable those skilled in the art to better understand the solution of the present invention, the technical solutions in the embodiments of the present invention will be described clearly and completely below with reference to the drawings corresponding to the embodiments of the present invention. Obviously, the described embodiments are only some of the embodiments of the present invention, rather than all embodiments. Based on the embodiments of the present invention, all other embodiments obtained by those of ordinary skill in the art without any creative labor should fall within the scope of the protection of the present invention.

It should be explained that terms such as "first", "second", etc. in the description and claims of the present invention as well as in the above drawings are used to distinguish similar objects, instead of necessarily describing a particular order or sequence. It should be understood that data used in this way may be exchanged in appropriate cases, so that the embodiments of the present invention described here may be implemented in an order other than those illustrated or described here. In addition, terms such as "comprise" and "have", as well as any variants thereof, are intended to cover the nonexclusive inclusion. For example, processes, methods, systems, products, or devices containing a series of steps or units are not necessarily limited to those steps or units clearly listed, but may include other steps or units, which are not clearly listed or are inherent to those processes, methods, products, or devices.

First, some nouns or terms appearing in the process of describing the embodiments of the present application are applicable to the following explanations.

CTR prediction model refers to a click-through rate prediction model.

NVLink/NVSwitch refers to a technology for high-speed interconnection among multiple GPU cards on a single machine, with high throughput.

Currently, distributed training architecture (e.g., ps worker) is the most common solution to deep learning asynchronous training, and has been widely used in scenarios such as click-through rate prediction and offline/online hybrid cluster training, etc. During asynchronous training, each worker independently initiates a request to a plurality of parameter servers and starts calculation after waiting for return of the request to ps. A response speed of ps has an important impact on the calculation speed of worker. That slowest ps determines the time when worker training is completed. As for how to improve the ps response speed in a process of distributed training in a case of limited hardware resources, with the widespread application of heterogeneous acceleration hardware such as a graphic process unit (GPU) in the field of deep learning, high-speed interconnection technologies such as a bus communication protocol (NVLink) or a fully connected bus communication protocol (NVSwith) may be used to achieve a very high communication throughput among multiple GPU cards within a machine. How to reasonably use the NVLink interconnection within a machine and the network interconnection among machines to enhance the performance of AllToAllV communication primitives among multiple machines is an urgent problem to be solved.

The present application may fully utilize NVLink bandwidth among a plurality of GPUs on a single physical machine and network bandwidth resources among a plurality of physical machines through hierarchical traffic planning, thereby enhancing the performance of AllToAllV primitives.

Embodiment 1

According to an embodiment of the present invention, there is provided an embodiment of a method for communication between processors. It should be explained that steps shown in a flow chart in the drawings may be executed in a computer system including such as a set of computer executable instructions. Moreover, a logical order is shown in the flow chart, but in some cases, the steps shown or described may be executed in a different order than the order described here.

The method embodiment provided in Embodiment 1 of the present application may be executed in a mobile terminal, a computer terminal, or a similar computing apparatus. FIG. 1 shows a hardware structural block diagram of a computer terminal (or a mobile device) for implementing a method for communication between processors. As shown in FIG. 1, a computer terminal 10 (or a mobile device 10) may comprise one or more (shown as 102a, 102b . . . 102n in the figure) processors (which may include but are not limited to a microprocessor (e.g., MCU), a programmable logic device (e.g., FPGA), or other processing apparatuses), a memory 104 for storing data, and a transmission module 106 for communication functions. In addition to the above, it may further comprise: a display, an input/output interface (I/O interface), a universal serial bus (USB) port (which may be included as one of ports of a USB bus), a network interface, a power supply and/or a camera. Those of ordinary skill in the art may understand that the structure shown in FIG. 1 is only illustrative, which is not a limitation of the structure of the above electronic apparatus. For example, computer terminal 10 may further comprise more or fewer components than those shown in FIG. 1, or have a different configuration than that shown in FIG. 1.

It should be noted that a communication circuit between the above one or more processors and/or other processors may generally be referred to herein as "an inter-processor communication circuit". This inter-processor communication circuit may be embodied in whole or in part as software, hardware, firmware or any other combination. In addition, the inter-processor communication circuit may be a single independent processing module, or may be wholly or partially integrated into any one of other elements in computer terminal 10 (or a mobile device). As involved in the embodiments of the present application, this inter-processor communication circuit serves as a processor control (e.g., selection of a variable resistor terminal path connected to the interface).

Memory 104 may be used for storing software programs and modules of application software, such as program instructions/data storage apparatuses corresponding to the method for communication between processors in the embodiments of the present application. The processors run the software programs and modules stored in memory 104, thereby executing various functional applications and communication between processors, namely implementing the above method for communication between processors. Memory 104 may comprise a high-speed random access memory, and may also comprise a non-volatile memory, such as one or more magnetic storage apparatuses, flash memories, or other non-volatile solid-state memories. In some examples, memory 104 may further comprise a memory located remotely relative to the processors, and this remote memory may be connected to computer terminal 10 through a network. Examples of the above network include but are not limited to the Internet, an intranet, a local area network, a mobile communication network and a combination thereof.

Transmission apparatus 106 is used for receiving or sending data via a network. Specific examples of the above network may comprise a wireless network provided by a communication provider of computer terminal 10. In an example, transmission apparatus 106 comprises a network interface controller (NIC), which may be connected to other network devices through a base station and thereby may communicate with the Internet. In an example, transmission apparatus 106 may be a radio frequency (RF) module, which is used for communicating with the Internet wirelessly.

The display may be, for example, a touch-screen liquid crystal display (LCD), and this LCD may enable a user to interact with a user interface of computer terminal 10 (or mobile device).

It should be explained here that in some optional embodiments, the computer device (or mobile device) shown in FIG. 1 above may comprise hardware elements (including circuits), software elements (including computer codes stored on a computer-readable medium), or a combination of both hardware elements and software elements. It should be pointed out that FIG. 1 is only one particular and specific example, and is intended to illustrate the types of components that may be present in the above computer device (or mobile device).

Figure 2:
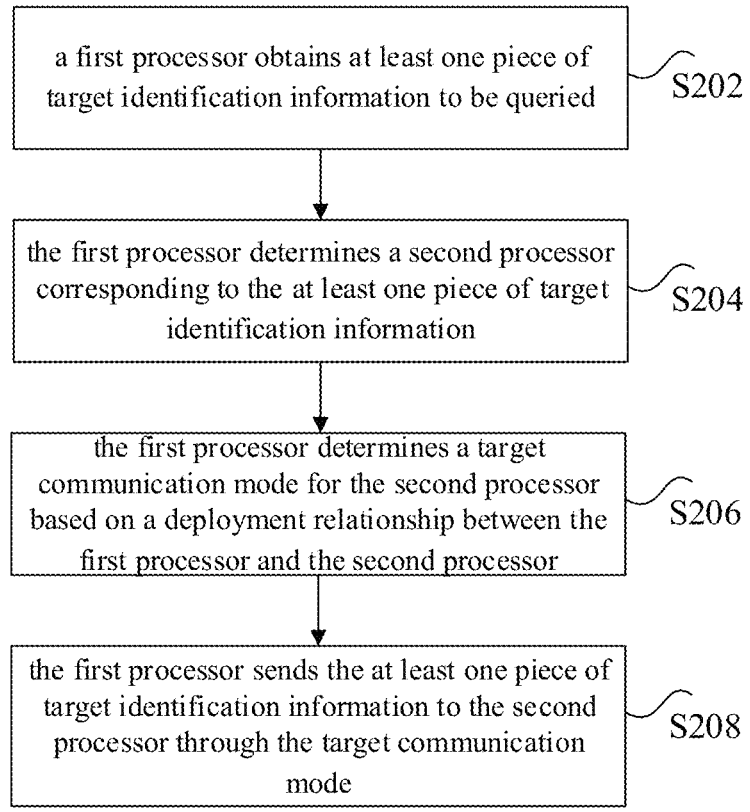
FIG. 2 is a flow chart of a method for communication between processors according to an embodiment of the present invention.

In the above running environment, the present application provides a method for communication between processors as shown in FIG. 2. FIG. 2 is a flow chart of a method for communication between processors according to Embodiment 1 of the present invention.

At step S202, a first processor obtains at least one piece of target identification information to be queried.

The above first processor may be a graphic process unit (GPU). There may be a plurality of first processors.

The above target identification information may be an ID, wherein the ID in the search field may be a search word, and a target query result corresponding to the target identification information may be a search result. The ID in the recommendation field may be a keyword related to a user's preference, and a target query result corresponding to the target identification information may be content associated with the keyword. The ID in the advertising field may be a name of a commodity, and a target query result corresponding to the target identification information may be attribute information and purchase information of the commodity.

In an optional embodiment, a client may send a query request to a server, the server may allocate the query request to the first processor, and the first processor may obtain the at least one piece of target identification information to be queried according to the query request. Optionally, after obtaining the query request, the first processor may parse keywords in the query request to obtain the at least one piece of target identification information. For example, the query request is to find women's wear and children's wear, where the keywords are women's wear and children's wear, identification information corresponding to women's wear may be ID0, and identification information corresponding to children's wear may be ID1. At this time, the target identification information may be parsed and obtained from the query request as ID0 and ID1.

In another optional embodiment, click prediction model has been widely applied in the fields of search, recommendation, advertising, etc. A click prediction model requires frequent distributed table lookup operations. In a process of training the click prediction model (CTR prediction model), a plurality of pieces of target identification information may be sent as training samples to a plurality of processors of the server, so that the plurality of processors may query target query results corresponding to the target identification information according to the target identification information, thereby completing the training process of distributed table lookup in the click prediction model.

Optionally, in a process where the click prediction model performs distributed table lookup, its core step is implemented through AllToAllV communication primitives. AllToAllV in the traditional high performance computing (HPC) field does not have enough support for GPUs, and does not consider usage scenarios of deep learning. For the problem that the AllToAllV solution in the traditional HPC field does not consider the usage scenarios of deep learning, the present application may be tailored for a distributed table lookup process in deep learning, by organically combining the distributed table lookup process with communication semantics, which may fully support GPU scenarios while meeting deep learning training tasks.

At step S204, the first processor determines a second processor corresponding to the at least one piece of target identification information.

The second processor is used for obtaining a target query result corresponding to the at least one piece of target identification information. There may be a plurality of second processors.

The above second processor may be a GPU located on the same physical server as the first processor, or may be a GPU located on a different physical server from the first processor.

In an optional embodiment, after receiving the at least one piece of target identification information to be queried, in order to improve a query speed for the target identification information, the first processor may allocate this target identification information to another processor for query. Optionally, bucketing processing may be performed for the target identification information through a preset bucketing rule, so as to allocate the target identification information to the second processor for query according to a bucketing result. In order to further improve the query speed for the target identification information, the target identification information may be preferentially allocated to a second processor in the same physical machine, and the first processor and the second processor in the same physical machine may communicate with each other by means of NVLink.

At step S206, the first processor determines a target communication mode for the second processor based on a deployment relationship between the first processor and the second processor.

The deployment relationship is used for indicating whether the first processor and the second processor are deployed on the same physical machine.

In an optional embodiment, in order to improve the communication speed between the first processor and the second processor, the deployment relationship between the first processor and the second processor may be obtained first. If the first processor and the second processor are located in the same physical machine, they may communicate utilizing NVlink interconnection. If the first processor and the second processor are located in different physical machines, they may communicate using the network.

Figure 3:
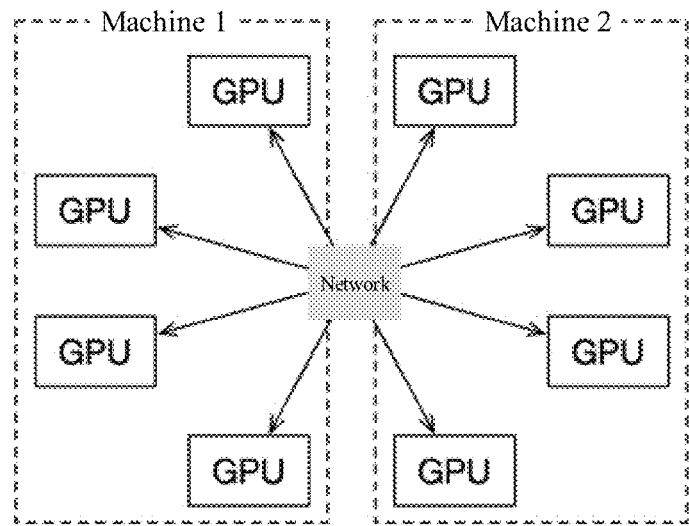
FIG. 3 is a topology diagram of communication among GPUs through network according to an embodiment of the present invention.
Figure 4:
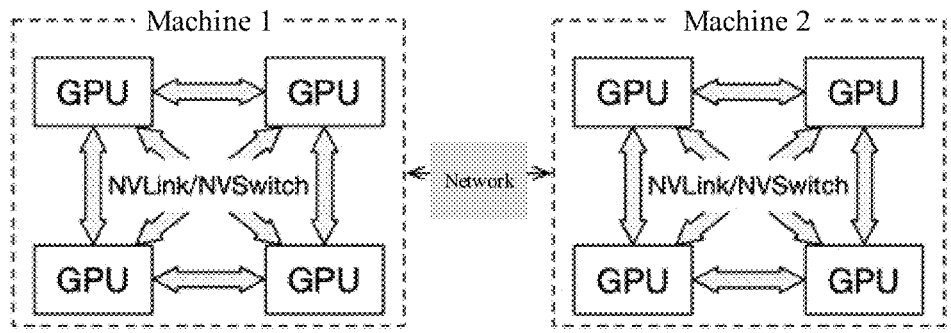
FIG. 4 is a topology diagram of GPU interconnection according to an embodiment of the present invention.

FIG. 3 shows a topology diagram of communication among GPUs through network. As shown in FIG. 3, for GPUs located in the same machine or GPUs located in different machines, they all communicate through the network, and this will result in low communication speed and great performance loss. In order to improve the speed of communication and improve the performance of machine, a communication mode of the GPUs may be determined according to a deployment mode among a plurality of GPUs. FIG. 4 shows a topology diagram of GPU interconnection, in which GPUs in machine 1 and machine 2 are interconnected by means of NVLink/NVSwitch, and machine 1 and machine 2 communicate therebetween through network, thereby improving the efficiency of communication, which in turn may improve the query efficiency for the target identification information.

At step S208, the first processor sends the at least one piece of target identification information to the second processor through the target communication mode.

In an optional embodiment, after determining the target communication mode between the first processor and the second processor, the at least one piece of target identification information may be sent to the second processor by utilizing the target communication mode, so that the second processor may query a target query result corresponding to the target identification information according to the target identification information. For the second processor located in the same physical machine, the target identification information may be sent to the second processor by utilizing the NVlink interconnection: while for the second processor located in a different physical machine, the target identification information may be sent to this second processor by utilizing the network.

In another optional embodiment, layout and addition/deletion/modification/query management of a hash table may be managed by a hash table management module. In order to reduce the consumption of video memory, a header of the hash table may be stored locally on a GPU, and a key value part of the hash table may be placed in a memory, for example, in a CPU, thereby improving the scalability of the hash table. Each GPU may hold a part of a global hash table according to a certain bucketing strategy, and all hash tables stored in GPUs may be merged together to constitute an entire data set of the hash tables.

In yet another optional embodiment, a process of implementation of that the second processor obtains a target query result corresponding to the at least one piece of target identification information may be the following: the second processor may query an offset address corresponding to this target identification information according to a locally stored header of a hash table, and the second processor may obtain the target query result corresponding to the at least one piece of target identification information from a CPU according to this offset address.

Through the above steps, first, a first processor may obtain at least one piece of target identification information to be queried: the first processor determines a second processor corresponding to the at least one piece of target identification information, wherein the second processor is used for obtaining a target query result corresponding to the at least one piece of target identification information: the first processor determines a target communication mode for the second processor based on a deployment relationship between the first processor and the second processor, wherein the deployment relationship is used for indicating whether the first processor and the second processor are deployed on the same physical machine; and the first processor sends the at least one piece of target identification information to the second processor through the target communication mode, so as to improve query efficiency by improving communication speed between the processors. It is easy to notice that by means of the target communication mode for the second processor as determined by the deployment relationship between the first processor and the second processor, communication links in physical machines may be fully utilized to communicate the processors located in the same physical machine, thereby improving the speed of communication between the processors in the same physical machine. Meanwhile, it is possible to alleviate occupancy of network resources among different physical machines, thereby improving the communication speed of processors located among different physical machines, and then solving the technical problem in the related art that the query efficiency of querying the target identification information is reduced due to low efficiency of communication between the processors.

Optionally, the target communication mode includes at least one of the following: a first communication mode and a second communication mode. The first processor determines a target communication mode for the second processor on the basis of a deployment relationship between the first processor and the second processor, which comprises: determining that the target communication mode is the first communication mode in response to the deployment relationship being that the first processor and the second processor are deployed on the same physical machine; and determining that the target communication mode is the second communication mode in response to the deployment relationship being that the first processor and the second processor are deployed on different physical machines: wherein the first communication mode is used for characterizing a communication mode in which communication is performed through a bus, and the second communication mode is used for characterizing a communication mode in which communication is performed through network.

The above first communication mode may be an NVlink bus communication mode: the above second communication mode may be a network communication mode, wherein the communication speed of the first communication mode may be greater than that of the second communication mode.

In an optional embodiment, if the first processor and the second processor are both on the same physical machine, they may communicate in the first communication mode with a faster communication speed within the machine. Due to a fast communication speed of the bus as physically connected, the communication speed between the first processor and the second processor may be improved. Additionally, the performance of communication among the plurality of GPUs in the same physical machine through NVlink intercommunication is much higher than through PCIe interconnection inside the machine, the throughput of the PCIe interconnection is 1 to 2 orders of magnitude higher than that of PCIe, and making full use of NVLink bandwidth within the physical machine may improve the efficiency of communication.

If the first processor and the second processor are not on the same physical machine, they may communicate through a network between machines. Since the processors within the same machine all communicate through the bus, the number of processors in communication through network may be greatly reduced, thereby releasing communication resources of the network, and then the communication speed may be improved by performing communication between processors located on different physical machines through network.

In another optional embodiment, a communication planning module may be used to determine the target communication mode for the second processor according to the deployment relationship between the first processor and the second processor, and the communication planning module may be used to determine that the first processor and the second processor deployed on the same physical machine communicate with each other by using NVLink, and determine that the first processor and the second processor deployed on different physical machines communicate with each other by using network.

Optionally, this method further comprises: the first processor obtains a grouping result corresponding to the second processor, wherein the grouping result is obtained on the basis of grouping the second processor by a physical machine to which the second processor belongs; and the first processor determines the deployment relationship based on the grouping result corresponding to the second processor.

In an optional embodiment, a plurality of second processors participating in the query process may be grouped according to physical machines to which they belong, a plurality of second processors located in the same physical machine may be placed in the same group to obtain the grouping result, and a grouping mark may be g0, g1 . . . gM. According to the grouping result corresponding to the second processor, the first processor may determine whether the first processor is located in the same group with the second processor. If they are located in the same one group, it may be determined that the first processor and the second processor are deployed on the same physical machine. If they are located in different groups, it may be determined that the first processor and the second processor are deployed on different physical machines.

Optionally, the first processor determines a second processor corresponding to the at least one piece of target identification information, which comprises: the first processor performs bucketing processing for the at least one piece of target identification information based on a preset bucketing rule to obtain a target bucketing result; and the first processor determines the second processor based on the target bucketing result.

The above preset bucketing rule may be set voluntarily.

In an optional embodiment, the first processor may bucket the at least one piece of target identification information into a plurality of second processors according to the preset bucketing rule. After bucketing, the target identification information held by each second processor may be divided into k parts, where k may be the number of all the second processors.

Optionally, this method further comprises: the second processor obtains an offset address of the at least one piece of target identification information based on a locally stored hash table; and the second processor queries the target query result in a target processor based on the offset address.

The above locally stored hash table may be a header of the hash table, and the above offset address may be a key value corresponding to the target identification information, wherein header information may include <ID, offset address of key value corresponding to ID on CPU>. In order to save video memory in a processor, the header of the hash table may be placed in a local storage of the second processor, and a memory portion of the hash table may be placed in the CPU, thereby reducing the memory resource occupancy in the processor.

In an optional embodiment, after obtaining the target identification information, the second processor may obtain the offset address of the key value of the target identification information on the CPU from the header of the hash table, and the second processor may query the target query result corresponding to this target identification information from the CPU according to a path of the offset address.

Figure 5:
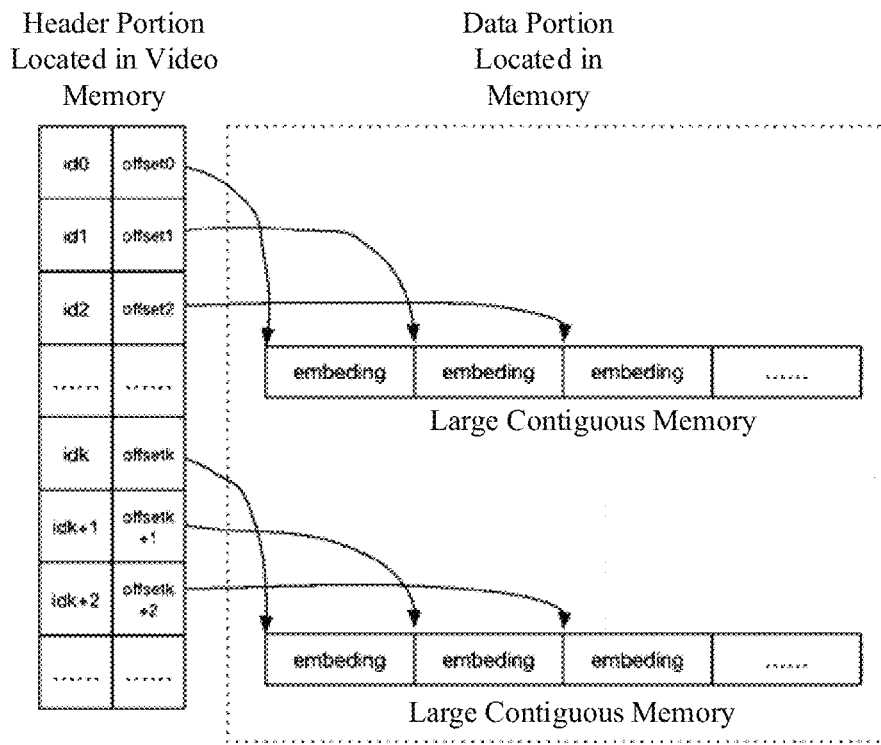
FIG. 5 is a schematic diagram of a hierarchical hash table according to an embodiment of the present invention.

A current open-source hash table implementation solution (HugeCTR) of NVIDIA is to put all active data in a GPU. Since a video memory capacity of the GPU is very scarce, there exists a scalability bottleneck in this solution. For the scalability issue in the HugeCTR solution, it is possible in the present application to perform improvement to a layout of the hash table. By means of hierarchical processing, a table header that takes up less space is placed in the GPU, while a key value portion that takes up more space is placed in a CPU memory, so as to decrease occupancy of the video memory, and improve the scalability. As shown in FIG. 5, it is a schematic diagram of a hierarchical hash table. As shown in FIG. 5, the table header that takes up less space may be placed in the second processor, while the key value portion of the hash table that takes up more space may be placed in the CPU memory. The video memory occupancy in the second processor may be significantly decreased by means of hierarchical processing, so that the system has better scalability.

Optionally, the second processor queries the target query result in a target processor based on the offset address, which comprises: in response to the target communication mode being a first communication mode, the second processor allocates the offset address to a third processor, wherein the third processor is used for querying a first query result from the target processor based on the offset address: in response to the target communication mode being a second communication mode, the second processor queries a second query result in the target processor based on the offset address; and the first query result and the second query result are merged to generate the target query result.

In an optional embodiment, if the target communication mode is the first communication mode, it means that the first processor and the second processor are located in the same physical machine. Since the communication mode in the same physical machine is NVLink communication with a higher communication speed, in order to further improve the query result of the offset address queried in the second processor, the offset address may be allocated to another processor in the same physical machine, that is, to the above third processor. Through the third processor, the first query result corresponding to the target identification information may be queried from the target processor according to the path of the offset address, and the first query result may be fed back to the first processor in the same physical machine.

Further, if the target communication mode is the second communication mode, it means that the first processor and the second processor are not located in the same physical machine. Since the communication mode between different physical machines is network communication with a lower communication speed, the second processor may be directly used to query the second query result corresponding to the target identification information from the target processor according to the offset address, and to feed back the second query result to the first processor located in a different physical machine.

Still further, the first query result and the second query result may be merged to obtain the above target query result.

In another optional embodiment, since communication paths used in the same physical machine are different from those used in different physical machines, a query process within the same physical machine and that within different physical machines may be performed simultaneously, so as to improve the efficiency of query.

Optionally, the first processor obtains at least one piece of target identification information to be queried, which comprises: the first processor obtains a plurality of pieces of initial identification information to be queried; and the first processor performs deduplication processing for the plurality of pieces of initial identification information to obtain the at least one piece of target identification information.

In an optional embodiment, after acquiring the plurality of pieces of initial identification information to be queried, the first processor may perform deduplication processing for the plurality of pieces of initial identification information, so as to obtain at least one piece of target identification information without duplication. Optionally, an ID deduplication module may be used for deduplication. After obtaining the plurality of pieces of initial identification information to be queried, each first processor may perform deduplication processing for the plurality of pieces of initial identification information through the deduplication module, to obtain at least one piece of target identification information, so as to decrease a query amount in a next step.

Optionally, this method further comprises: in response to that the second processor obtains a plurality of pieces of target identification information, the second processor performs deduplication processing for the plurality of pieces of target identification information to obtain processed target identification information.

In another optional embodiment, after obtaining the plurality of pieces of target identification information sent by the first processor, the second processor may deduplicate the plurality of pieces of target identification information, to obtain the processed target identification information, so as to decrease a further query amount of the second processor.

Figure 6:
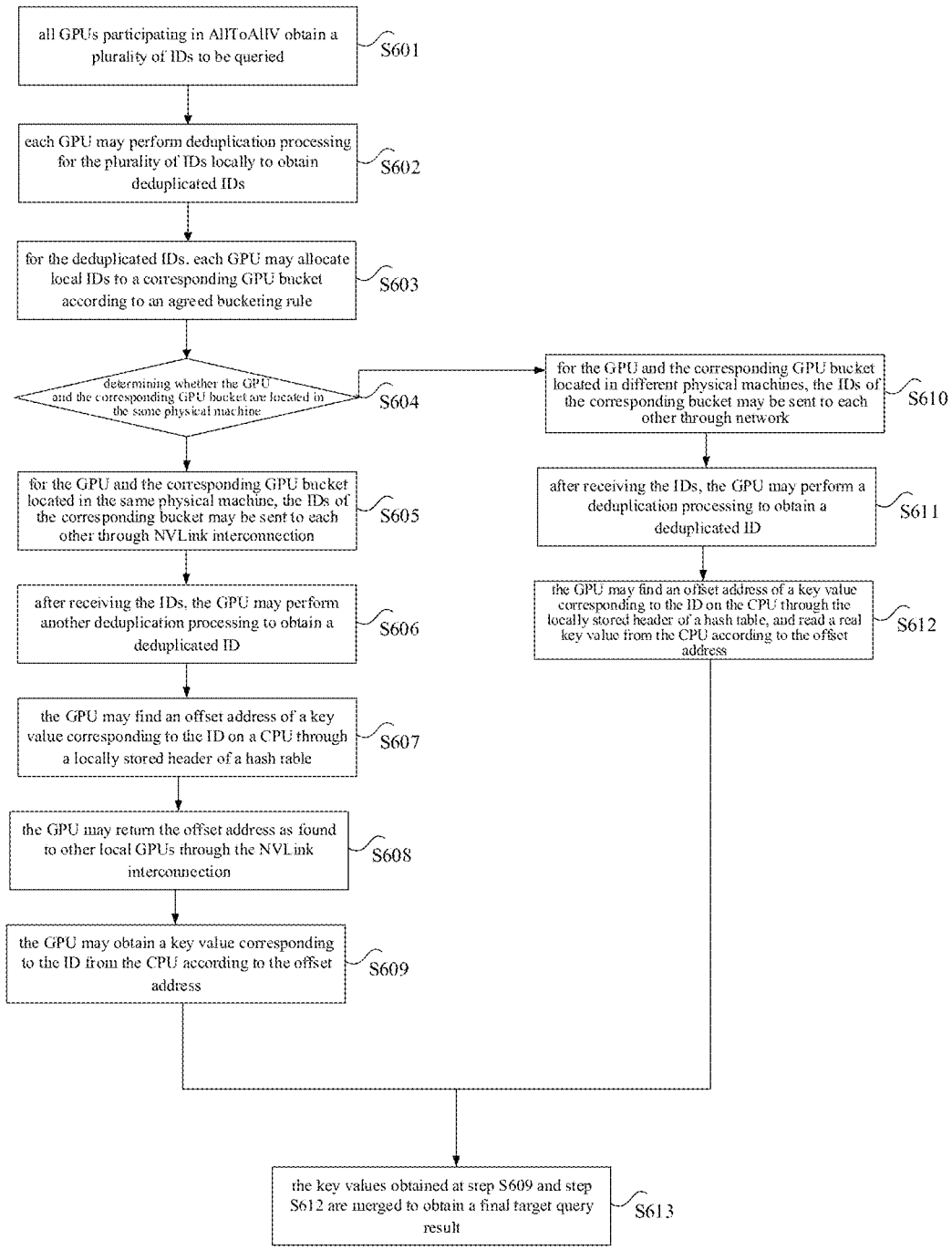
FIG. 6 is a flow chart of another method for communication between processors according to an embodiment of the present invention.

A preferred embodiment of the present application will be described below with reference to FIGS. 6 to 7. As shown in FIG. 6, this method comprises:

At step S601, all GPUs participating in AllToAllV obtain a plurality of IDs to be queried:

The above GPUs may be the first processor. The above plurality of IDs may be the plurality of pieces of initial identification information.

At step S602, each GPU may perform deduplication processing for the plurality of IDs locally to obtain deduplicated IDs:

The above deduplicated IDs may be the above at least one piece of target identification information.

At step S603, for the deduplicated IDs, each GPU may allocate local IDs to a corresponding GPU bucket according to an agreed bucketing rule:

The above corresponding GPU may be the second processor.

Optionally, after bucketing, the IDs held by each GPU will be divided into K parts, where K is the total number of global GPUs.

At step S604, it is determined whether the GPU and the corresponding GPU bucket are located in the same physical machine, if so, execute step S605, and if not, execute step S609.

Optionally, the GPUs participating in AllToAllV may be grouped according to nodes of the physical machines, so that GPUs belonging to the same physical machine node may be placed in the same group, and the GPUs belonging to the same group are in the same physical machine.

At step S605, for the GPU and the corresponding GPU bucket located in the same physical machine, the IDs of the corresponding bucket may be sent to each other through NVLink interconnection.

At step S606, after receiving the IDs, the GPU may perform another deduplication processing to obtain a deduplicated ID.

At step S607, the GPU may find an offset address of a key value corresponding to the ID on a CPU through a locally stored header of a hash table.

The above CPU may be the target processor.

At step S608, the GPU may return the offset address as found to other local GPUs through the NVLink interconnection.

The above other GPUs may be the third processor.

At step S609, the GPU may obtain a key value corresponding to the ID from the CPU according to the offset address.

The above key value corresponding to the ID may be the first query result obtained and queried within the same physical machine.

At step S610, for the GPU and the corresponding GPU bucket located in different physical machines, the IDs of the corresponding bucket may be sent to each other through network.

At step S611, after receiving the IDs, the GPU may perform a deduplication processing to obtain a deduplicated ID.

At step S612, the GPU may find an offset address of a key value corresponding to the ID on the CPU through the locally stored header of a hash table, and read a real key value from the CPU according to the offset address.

The above key value corresponding to the ID may be the second query result obtained between different physical machines.

At step S613, the key values obtained at step S609 and step S612 may be merged to obtain a final target query result.

Optionally, the final target query result may be retrieved by a query result retrieval module. For GPUs located in the same physical machine, result retrieval is to copy the corresponding key value in the CPU. For GPUs in different machines, the result retrieval is to obtain a remote query result through network.

Figure 7:
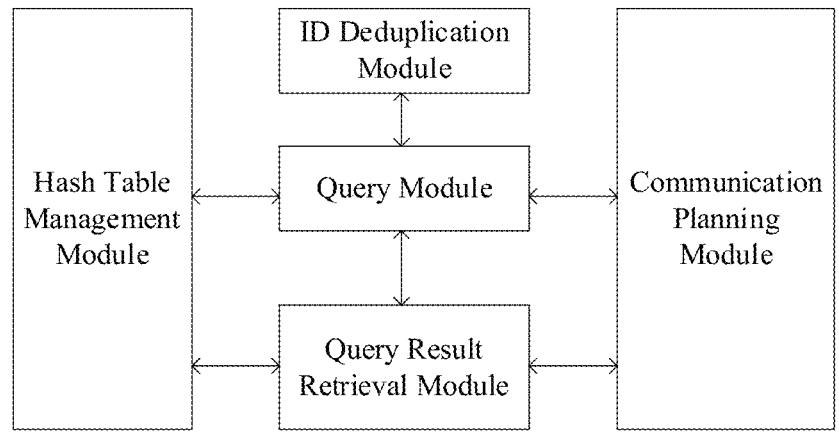
FIG. 7 is an AllToAllV implementation architecture of a single-machine multi-GPU card environment according to an embodiment of the present invention.

Shown in FIG. 7 is an AllToAllV implementation architecture of a single-machine multi-GPU card environment, comprising: a hash table management module, an ID deduplication module, a query module, a query result retrieval module, and a communication planning module. The hash table management module is used for managing layout and addition/deletion/modification/query of a hash table. In order to decrease video memory consumption, a header of the hash table may be placed onto a GPU to accelerate query, and a key value portion of the table may be placed to a memory, enhancing scalability. Each GPU holds a portion of the global hash table according to a certain bucketing strategy, and all GPU data are merged together to constitute the entire hash table data set. The ID deduplication module is used for deduplicating IDs before table lookup. Duplicate IDs only need to be queried once, which may decrease the amount of data queried. The query module is used for querying the header portion of the hash table located on the GPU, and a queried result is an offset address of the key value in the CPU memory. The query result retrieval module is used for retrieving a final query result. For GPUs in the same machine, result retrieval is to copy the corresponding key value in the CPU: while for GPUs in different machines, the result retrieval is to obtain a remote query result through network. The communication planning module is used for planning a preferred communication path according to locations of GPUs. NVLink communication is used for GPUs on the same machine, while network communication is used for GPUs between different machines.

In order to further improve the computing power of a single physical machine, all computing processes may be put into the same physical machine, so as to completely avoid communication between physical machines. In order to further increase the GPU video memory, all hash tables may be placed within the GPU to avoid the overhead of remote table lookup.

Through the above steps, a table lookup process may be completed with the help of NVLink communication between GPUs within the same physical machine, and a table lookup process may be completed among GPUs in different physical machines through network communication. The two are performed simultaneously, so as to improve the efficiency of query.

It should be explained that, for the aforementioned various method embodiments, for the sake of simple description, the method embodiments are expressed as a combination of a series of actions. However, those skilled in the art should know that the present invention is not limited by the described action order, because according to the present invention, some steps may be performed in other orders or simultaneously. Secondly, those skilled in the art should also be aware that the embodiments described in the specification are preferred embodiments, and the actions and modules involved are not necessarily indispensable for the present invention.

Through the description of the above embodiments, those skilled in the art may clearly understand that the method for communication between processors according to the above embodiments may be implemented with the help of software and a necessary general-purpose hardware platform, and of course, may also be implemented by hardware. In many cases, the former is a better implementation. Based on such understanding, the essence of the technical solutions of the present invention or the part that makes a contribution over the prior art may be embodied in the form of a software product. The computer software product is stored in a storage medium (e.g., a ROM/RAM, a disk, an optical disk), and contains several instructions to enable a terminal device (which may be a mobile phone, a computer, a server, or a network device, etc.) to execute the methods described in various embodiments of the present invention.

Embodiment 2

Figure 8:
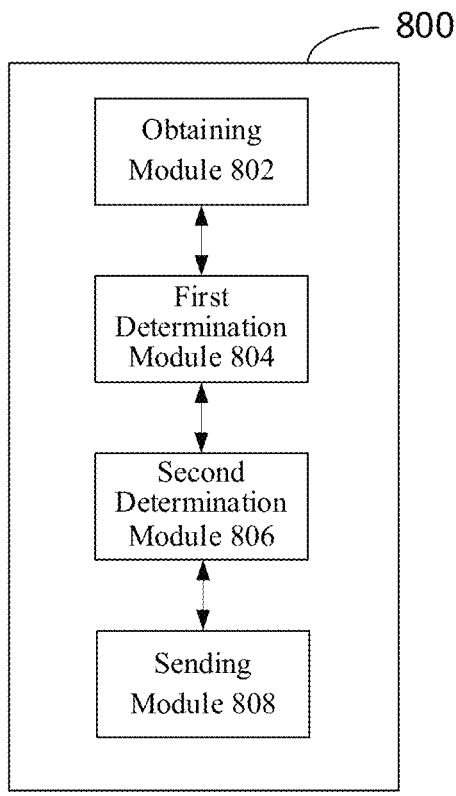
FIG. 8 is a schematic diagram of an apparatus for communication between processors according to an embodiment of the present invention.

According to an embodiment of the present invention, there is further provided an apparatus for communication between processors for implementing the above method for communication between processors. As shown in FIG. 8, this apparatus 800 comprises: an obtaining module 802, a first determination module 804, a second determination module 806, and a sending module 808.

The obtaining module is used for obtaining, by a first processor, at least one piece of target identification information to be queried: the first determination module is used for determining, by the first processor, a second processor corresponding to the at least one piece of target identification information, wherein the second processor is used for obtaining a target query result corresponding to the at least one piece of target identification information; the second determination module is used for determining, by the first processor, a target communication mode for the second processor based on a deployment relationship between the first processor and the second processor, wherein the deployment relationship is used for indicating whether the first processor and the second processor are deployed on the same physical machine; and the sending module is used for sending, by the first processor, the at least one piece of target identification information to the second processor through the target communication mode.

It should be explained here that the above obtaining module, determination modules and sending module correspond to the steps S202 to S208 in Embodiment 1. The examples and application scenarios implemented by the four modules are the same as by the corresponding steps, but are not limited to the content disclosed in the above Embodiment 1. It should be explained that the above modules as a portion of the apparatus may run in computer terminal 10 provided in Embodiment 1.

Optionally, the second determination module comprises: a first determination unit and a second determination unit.

The first determination unit is used for determining that the target communication mode is the first communication mode in response to the deployment relationship being that the first processor and the second processor are deployed on the same physical machine; and the second determination unit is used for determining that the target communication mode is the second communication mode in response to the deployment relationship being that the first processor and the second processor are deployed on different physical machines; wherein the first communication mode is used for characterizing a communication mode in which communication is performed through a bus, and the second communication mode is used for characterizing a communication mode in which communication is performed through network.

Optionally, this apparatus further comprises: a third determination module.

The obtaining module is further used for obtaining, by the first processor, a grouping result corresponding to the second processor, wherein the grouping result is obtained on the basis of grouping the second processor by a physical machine to which the second processor belongs; and the third determination module is used for determining, by the first processor, the deployment relationship based on the grouping result corresponding to the second processor.

Optionally, the first determination module comprises: a bucketing unit and a third determination unit.

The bucketing unit is used for performing, by the first processor, bucketing processing for the at least one piece of target identification information on the basis of a preset bucketing rule to obtain a target bucketing result; and the third determination unit is used for determining, by the first processor, the second processor based on the target bucketing result.

Optionally, this apparatus further comprises: a query module.

The obtaining module is used for obtaining, by the second processor, an offset address of the at least one piece of target identification information based on a locally stored hash table; and the query module is used for querying, by the second processor, the target query result in a target processor based on the offset address.

Optionally, the query module comprises: an allocation unit, a query unit, and a merging unit.

The allocation unit is used for, in response to the target communication mode being a first communication mode, allocating, by the second processor, the offset address to a third processor, wherein the third processor is used for querying a first query result from the target processor based on the offset address; the query unit is used for, in response to the target communication mode being a second communication mode, querying, by the second processor, a second query result in the target processor based on the offset address; and the merging unit is used for merging the first query result and the second query result to generate the target query result.

Optionally, the obtaining module comprises: an obtaining unit and a deduplication unit.

The obtaining unit is used for obtaining, by the first processor, a plurality of pieces of initial identification information to be queried; and the deduplication unit is used for performing, by the first processor, deduplication processing for the plurality of pieces of initial identification information to obtain the at least one piece of target identification information.

Optionally, this apparatus further comprises: a deduplication module.

The deduplication module is used for, in response to that the second processor obtains a plurality of pieces of target identification information, performing, by the second processor, deduplication processing for the plurality of pieces of target identification information to obtain processed target identification information.

It should be explained that the preferred implementation solutions involved in the above embodiments of the present application are the same as the solutions, application scenarios, and implementation processes provided in Embodiment 1, but are not limited to the solutions provided in Embodiment 1.

Embodiment 3

An embodiment of the present invention may provide a system for communication between processors, comprising: a first processor, used for obtaining at least one piece of target identification information to be queried; and a second processor, communicating with the first processor through a target communication mode, and used for obtaining a target query result corresponding to the at least one piece of target identification information, wherein the target communication mode is determined by a deployment relationship between the first processor and the second processor, and the deployment relationship is used for indicating whether the first processor and the second processor are deployed on the same physical machine.

It should be explained that the preferred implementation solution involved in the above embodiment of the present application is the same as the solutions, application scenarios, and implementation processes provided in Embodiment 1, but is not limited to the solutions provided in Embodiment 1.

Embodiment 4

An embodiment of the present invention may provide a computer terminal, which may be any computer terminal device in a computer terminal group. Optionally, in this embodiment, the above computer terminal may also be replaced with a terminal device such as a mobile terminal.

Optionally, in this embodiment, the above computer terminal may be located in at least one of a plurality of network devices in a computer network.

In this embodiment, the above computer terminal may execute program codes for the following steps in the method for communication between processors: obtaining, by a first processor, at least one piece of target identification information to be queried: determining, by the first processor, a second processor corresponding to the at least one piece of target identification information, wherein the second processor is used for obtaining a target query result corresponding to the at least one piece of target identification information: determining, by the first processor, a target communication mode for the second processor based on a deployment relationship between the first processor and the second processor, wherein the deployment relationship is used for indicating whether the first processor and the second processor are deployed on the same physical machine; and sending, by the first processor, the at least one piece of target identification information to the second processor through the target communication mode.

Figure 9:
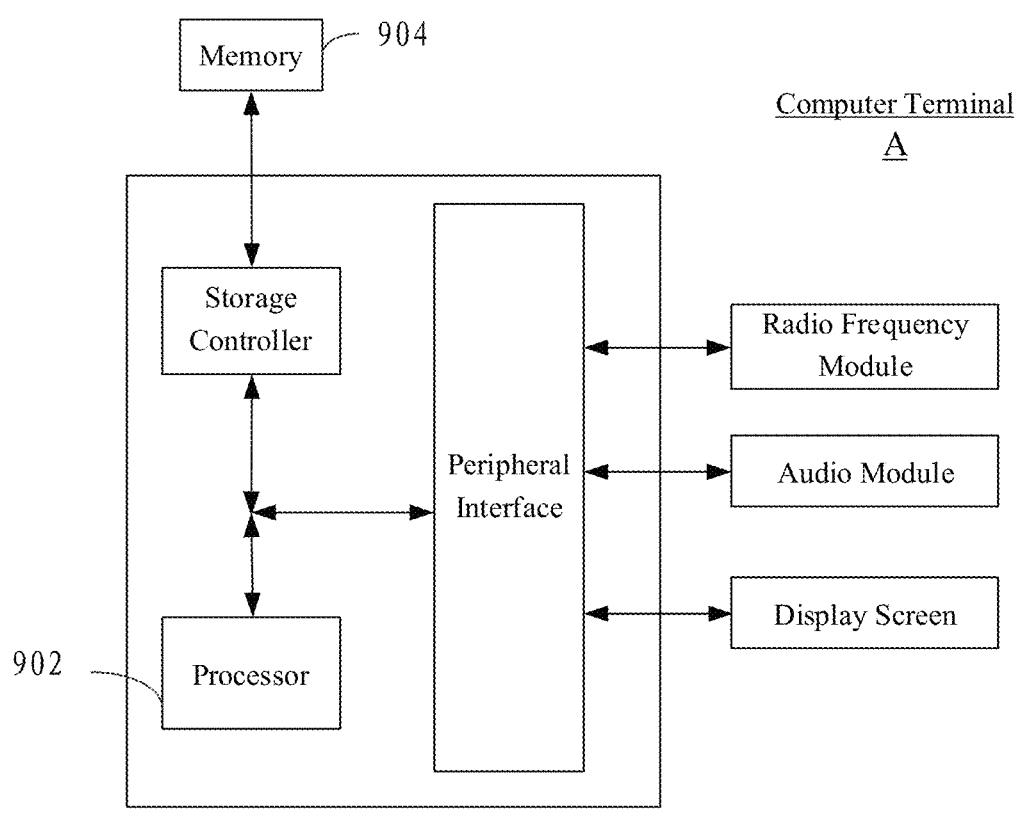
FIG. 9 is a structural block diagram of a computer terminal according to an embodiment of the present invention.

Optionally, FIG. 9 is a structural block diagram of a computer terminal according to an embodiment of the present invention. As shown in FIG. 9, this computer terminal A may comprise: one or more (only one shown in the figure) processors 902 and a memory 904.

The memory may be used for storing software programs and modules, such as program instructions/modules corresponding to the method and apparatus for communication between processors in the embodiments of the present invention. The processors run the software programs and modules stored in the memory, to execute various functional applications and communication between processors, namely implementing the above method for communication between processors. The memory may comprise a high-speed random access memory, and may also comprise a non-volatile memory, such as one or more magnetic storage apparatuses, flash memories, or other non-volatile solid-state memories. In some examples, the memory may further comprise a memory located remotely relative to a processor, and this remote memory may be connected to terminal A through network. Examples of the above network include but are not limited to the Internet, an intranet, a local area network, a mobile communication network and a combination thereof.

The processors may call information and application programs stored in the memory through a transmission apparatus to execute the following steps: a first processor obtains at least one piece of target identification information to be queried; the first processor determines a second processor corresponding to the at least one piece of target identification information, wherein the second processor is used for obtaining a target query result corresponding to the at least one piece of target identification information: the first processor determines a target communication mode for the second processor based on a deployment relationship between the first processor and the second processor, wherein the deployment relationship is used for indicating whether the first processor and the second processor are deployed on the same physical machine; and the first processor sends the at least one piece of target identification information to the second processor through the target communication mode.

Optionally, the above processors may further execute program codes for the following steps: determining that the target communication mode is the first communication mode in response to the deployment relationship being that the first processor and the second processor are deployed on the same physical machine; and determining that the target communication mode is the second communication mode in response to the deployment relationship being that the first processor and the second processor are deployed on different physical machines: wherein the first communication mode is used for characterizing a communication mode in which communication is performed through a bus, and the second communication mode is used for characterizing a communication mode in which communication is performed through network.

Optionally, the above processors may further execute program codes for the following steps: obtaining, by the first processor, a grouping result corresponding to the second processor, wherein the grouping result is obtained on the basis of grouping the second processor by a physical machine to which the second processor belongs; and determining, by the first processor, the deployment relationship based on the grouping result corresponding to the second processor.

Optionally, the above processors may further execute program codes for the following steps: performs, by the first processor, bucketing processing for the at least one piece of target identification information based on a preset bucketing rule to obtain a target bucketing result; and determining, by the first processor, the second processor based on the target bucketing result.

Optionally, the above processors may further execute program codes for the following steps: obtaining, by the second processor, an offset address of the at least one piece of target identification information based on a locally stored hash table; and querying, by the second processor, the target query result in a target processor based on the offset address.

Optionally, the above processors may further execute program codes for the following steps: in response to the target communication mode being a first communication mode, allocating, by the second processor, the offset address to a third processor, wherein the third processor is used for querying a first query result from the target processor based on the offset address: in response to the target communication mode being a second communication mode, querying, by the second processor, a second query result in the target processor based on the offset address; and merging the first query result and the second query result to generate the target query result.

Optionally, the above processors may further execute program codes for the following steps: obtaining, by the first processor, a plurality of pieces of initial identification information to be queried; and performing, by the first processor, deduplication processing for the plurality of pieces of initial identification information to obtain the at least one piece of target identification information.

Optionally, the above processors may further execute program codes for the following steps: in response to that the second processor obtains a plurality of pieces of target identification information, performing, by the second processor, deduplication processing for the plurality of pieces of target identification information to obtain processed target identification information.

By employing the embodiments of the present invention, there is provided a solution of communication between processors. First, a first processor may obtain at least one piece of target identification information to be queried: the first processor determines a second processor corresponding to the at least one piece of target identification information, wherein the second processor is used for obtaining a target query result corresponding to the at least one piece of target identification information; the first processor determines a target communication mode for the second processor based on a deployment relationship between the first processor and the second processor, wherein the deployment relationship is used for indicating whether the first processor and the second processor are deployed on the same physical machine; and the first processor sends the at least one piece of target identification information to the second processor through the target communication mode, so as to improve query efficiency by improving communication speed between the processors. It is easy to notice that by means of the target communication mode for the second processor as determined by the deployment relationship between the first processor and the second processor, communication links in physical machines may be fully utilized to communicate the processors located in the same physical machine, thereby improving the speed of communication between the processors in the same physical machine. Meanwhile, it is possible to alleviate occupancy of network resources among different physical machines, thereby improving the communication speed of processors located among different physical machines, and then solving the technical problem in the related art that the query efficiency of querying the target identification information is reduced due to low efficiency of communication between the processors.

Those of ordinary skill in the art may understand that the structure shown in FIG. 9 is only illustrative, and the computer terminal may also be a smart phone (e.g., an Android phone, an iOS phone, etc.), a tablet computer, a palm computer, and a mobile internet device (MID), a PAD or other terminal devices. FIG. 9 is not a limitation to the structure of the above electronic apparatus. For example, computer terminal A may also include more or fewer components than those shown in FIG. 9 (e.g., a network interface, a display apparatus, etc.), or have a configuration different from that shown in FIG. 9.

Those of ordinary skill in the art may understand that all or part of the steps in the various methods in the above embodiments may be completed by instructing the hardware related to the terminal device through a program. The program may be stored in a computer-readable storage medium, and the storage medium may include: a flash disk, a read-only memory (ROM), a random access memory (RAM), a magnetic disk or an optical disk, and the like.

Embodiment 5

An embodiment of the present invention further provides a storage medium. Optionally, in this embodiment, the above storage medium may be used for storing program codes executed in the method for communication between processors provided in the above Embodiment 1.

Optionally, in this embodiment, the above storage medium may be located in any computer terminal in a computer terminal group in a computer network, or in any mobile terminal in a mobile terminal group.

Optionally, in this embodiment, the storage medium is set to store program codes for executing the following steps: obtaining, by a first processor, at least one piece of target identification information to be queried: determining, by the first processor, a second processor corresponding to the at least one piece of target identification information, wherein the second processor is used for obtaining a target query result corresponding to the at least one piece of target identification information; determining, by the first processor, a target communication mode for the second processor based on a deployment relationship between the first processor and the second processor, wherein the deployment relationship is used for indicating whether the first processor and the second processor are deployed on the same physical machine; and sending, by the first processor, the at least one piece of target identification information to the second processor through the target communication mode.

Optionally, the above processors may further execute program codes for the following steps: determining that the target communication mode is a first communication mode in response to the deployment relationship being that the first processor and the second processor are deployed on the same physical machine; and determining that the target communication mode is a second communication mode in response to the deployment relationship being that the first processor and the second processor are deployed on different physical machines; wherein the first communication mode is used for characterizing a communication mode in which communication is performed through a bus, and the second communication mode is used for characterizing a communication mode in which communication is performed through network.

Optionally, the above processors may further execute program codes for the following steps: obtaining, by the first processor, a grouping result corresponding to the second processor, wherein the grouping result is obtained on the basis of grouping the second processor by a physical machine to which the second processor belongs; and determining, by the first processor, the deployment relationship based on the grouping result corresponding to the second processor.

Optionally, the above processors may further execute program codes for the following steps: performing, by the first processor, bucketing processing for the at least one piece of target identification information based on a preset bucketing rule to obtain a target bucketing result; and determining, by the first processor the second processor based on the target bucketing result.

Optionally, the above processors may further execute program codes for the following steps: obtaining, by the second processor, an offset address of the at least one piece of target identification information based on a locally stored hash table; and querying, by the second processor, the target query result in a target processor based on the offset address.

Optionally, the above processors may further execute program codes for the following steps: in response to the target communication mode being a first communication mode, allocating, by the second processor, the offset address to a third processor, wherein the third processor is used for querying a first query result from the target processor based on the offset address: in response to the target communication mode being a second communication mode, querying, by the second processor, a second query result in the target processor based on the offset address; and merging the first query result and the second query result to generate the target query result.

Optionally, the above processors may further execute program codes for the following steps: obtaining, by the first processor, a plurality of pieces of initial identification information to be queried; and performing, by the first processor, deduplication processing for the plurality of pieces of initial identification information to obtain the at least one piece of target identification information.

Optionally, the above processors may further execute program codes for the following steps: in response to that the second processor obtains a plurality of pieces of target identification information, performing, by the second processor, deduplication processing for the plurality of pieces of target identification information to obtain processed target identification information.

By employing the embodiments of the present invention, there is provided a solution of communication between processors. First, a first processor may obtain at least one piece of target identification information to be queried: the first processor determines a second processor corresponding to the at least one piece of target identification information, wherein the second processor is used for obtaining a target query result corresponding to the at least one piece of target identification information; the first processor determines a target communication mode for the second processor based on a deployment relationship between the first processor and the second processor, wherein the deployment relationship is used for indicating whether the first processor and the second processor are deployed on the same physical machine; and the first processor sends the at least one piece of target identification information to the second processor through the target communication mode, so as to improve query efficiency by improving communication speed between the processors. It is easy to notice that by means of the target communication mode for the second processor as determined by the deployment relationship between the first processor and the second processor, communication links in physical machines may be fully utilized to communicate the processors located in the same physical machine, thereby improving the speed of communication between the processors in the same physical machine. Meanwhile, it is possible to alleviate occupancy of network resources among different physical machines, thereby improving the communication speed of processors located among different physical machines, and then solving the technical problem in the related art that the query efficiency of querying the target identification information is reduced due to low efficiency of communication between the processors.

The serial numbers of the above embodiments of the present invention are only for description, and do not represent the strengths or weaknesses of the embodiments.

In the above embodiments of the present invention, different aspects are focused on in the descriptions of the various embodiments. A portion not detailed in a certain embodiment may be referred to in the relevant descriptions of other embodiments.

In the several embodiments provided in the present application, it should be understood that the disclosed technical content may be implemented in other ways. The apparatus embodiments described above are only illustrative. For example, division of the units is only a logical function division, and there may be another division way in actual implementations. For example, a plurality of units or components may be combined or may be integrated into another system, or some features may be omitted, or not executed. In another point, mutual coupling or direct coupling or communication connection shown or discussed may be implemented through some interfaces, and indirect coupling or communication connection between the units or modules may be implemented in electrical or other forms.

The units described as separate parts may or may not be physically separated. The parts displayed as units may or may not be physical units, that is, they may be located in one place, or may also be distributed to a plurality of network units. Part or all of the units may be selected according to actual needs to achieve the purposes of the solutions of the embodiments.

Additionally, in each embodiment of the present invention, the various functional units may be integrated into one processing unit, or they may exist separately in physical terms, or two or more units may be integrated into one unit. The above integrated unit may be implemented in the form of hardware or in the form of software functional unit.

If the integrated unit is implemented in the form of software functional unit, and sold or used as an independent product, it may be stored in one computer-readable storage medium. Based on such understanding, the essence of the technical solutions of the present invention, or the part that makes a contribution over the prior art, or all or part of the technical solutions, may be embodied in the form of a software product. This computer software product is stored in a storage medium, including several instructions to enable a computer device (which may be a personal computer, a server, or a network device, etc.) to execute all or part of the steps of the methods described in various embodiments of the present invention. The aforementioned storage medium includes: various media that may store program codes, such as a U disk, a read-only memory (ROM), a random access memory (RAM), a mobile hard disk, a magnetic disk or optical disk, etc.

Described above are only preferred implementations of the present invention. It should be pointed out that for those of ordinary skill in the art, several improvements and modifications may be further made without departing from the principle of the present invention, and these improvements and modifications should also fall within the protection scope of the present invention.

What is claimed is:

1. A method for communication between processors, comprising:
    obtaining, by a first processor, at least one piece of target identification information to be queried;
    determining, by the first processor, a second processor corresponding to the at least one piece of target identification information, wherein the second processor is used for obtaining a target query result corresponding to the at least one piece of target identification information;
    determining, by the first processor, a target communication mode for the second processor based on a deployment relationship between the first processor and the second processor; and
    sending, by the first processor, the at least one piece of target identification information to the second processor through the target communication mode;
    wherein the target communication mode includes at least one of: a first communication mode and a second communication mode; and the determining, by the first processor, the target communication mode for the second processor based on the deployment relationship between the first processor and the second processor comprises:
    determining that the target communication mode is the first communication mode in response to the deployment relationship being that the first processor and the second processor are deployed on the same physical machine; and
    determining that the target communication mode is the second communication mode in response to the deployment relationship being that the first processor and the second processor are deployed on different physical machines;
    wherein the first communication mode is used for characterizing a communication mode in which communication is performed through a bus, and the second communication mode is used for characterizing a communication mode in which communication is performed through network.

2. The method according to claim 1, further comprising:
    obtaining, by the first processor, a grouping result corresponding to the second processor, wherein the grouping result is obtained on the basis of grouping the second processor by a physical machine to which the second processor belongs; and
    determining, by the first processor, the deployment relationship based on the grouping result corresponding to the second processor.

3. The method according to claim 1, wherein the determining, by the first processor, the second processor corresponding to the at least one piece of target identification information comprises:
    performing, by the first processor, bucketing processing for the at least one piece of target identification information based on a preset bucketing rule to obtain a target bucketing result; and
    determining, by the first processor, the second processor based on the target bucketing result.

4. The method according to claim 1, further comprising:
    obtaining, by the second processor, an offset address of the at least one piece of target identification information based on a locally stored hash table; and
    querying, by the second processor, the target query result in a target processor based on the offset address.

5. The method according to claim 4, wherein the querying, by the second processor, the target query result in the target processor based on the offset address comprises:
    in response to the target communication mode being a first communication mode, allocating, by the second processor, the offset address to a third processor, wherein the third processor is used for querying a first query result from the target processor based on the offset address;
    in response to the target communication mode being a second communication mode, querying, by the second processor, a second query result in the target processor based on the offset address; and merging the first query result and the second query result to generate the target query result.

6. The method according to claim 1, wherein the obtaining, by the first processor, the at least one piece of target identification information to be queried comprises:
obtaining, by the first processor, a plurality of pieces of initial identification information to be queried; and
performing, by the first processor, deduplication processing for the plurality of pieces of initial identification information to obtain the at least one piece of target identification information.

7. The method according to claim 4, further comprising:
in response to that the second processor obtains a plurality of pieces of target identification information, performing, by the second processor, deduplication processing for the plurality of pieces of target identification information to obtain processed target identification information.

8. A system for communication between processors, comprising:
a first processor, used for obtaining at least one piece of target identification information to be queried; and
a second processor, communicating with the first processor through a target communication mode, and used for obtaining a target query result corresponding to the at least one piece of target identification information, wherein the target communication mode is determined by a deployment relationship between the first processor and the second processor;
wherein the target communication mode includes at least one of: a first communication mode and a second communication mode; and wherein
the first processor determines that the target communication mode is the first communication mode in response to the deployment relationship being that the first processor and the second processor are deployed on the same physical machine; and
the first processor determines that the target communication mode is the second communication mode in response to the deployment relationship being that the first processor and the second processor are deployed on different physical machines;
wherein the first communication mode is used for characterizing a communication mode in which communication is performed through a bus, and the second communication mode is used for characterizing a communication mode in which communication is performed through network.

9. The system according to claim 8, wherein
the first processor obtains a grouping result corresponding to the second processor, wherein the grouping result is obtained on the basis of grouping the second processor by a physical machine to which the second processor belongs; and
first processor determines the deployment relationship based on the grouping result corresponding to the second processor.

10. The system according to claim 8, wherein
the first processor performs bucketing processing for the at least one piece of target identification information based on a preset bucketing rule to obtain a target bucketing result; and
the first processor determines the second processor based on the target bucketing result.

11. The system according to claim 8, wherein
the second processor obtains an offset address of the at least one piece of target identification information based on a locally stored hash table; and
the second processor queries the target query result in a target processor based on the offset address.

12. The system according to claim 11, wherein
in response to the target communication mode being a first communication mode, the second processor allocates the offset address to a third processor, wherein the third processor is used for querying a first query result from the target processor based on the offset address;
in response to the target communication mode being a second communication mode, the second processor queries a second query result in the target processor based on the offset address; and
the second processor merges the first query result and the second query result to generate the target query result.

13. The system according to claim 8, wherein
the first processor obtains a plurality of pieces of initial identification information to be queried; and
the first processor performs deduplication processing for the plurality of pieces of initial identification information to obtain the at least one piece of target identification information.

14. The system according to claim 11, wherein
in response to that the second processor obtains a plurality of pieces of target identification information, the second processor performs deduplication processing for the plurality of pieces of target identification information to obtain processed target identification information.

15. A non-transitory storage medium, comprising a stored program, wherein the program, when running, controls a device where the storage medium is located to perform operations of:
obtaining, by a first processor, at least one piece of target identification information to be queried;
determining, by the first processor, a second processor corresponding to the at least one piece of target identification information, wherein the second processor is used for obtaining a target query result corresponding to the at least one piece of target identification information;
determining, by the first processor, a target communication mode for the second processor based on a deployment relationship between the first processor and the second processor; and
sending, by the first processor, the at least one piece of target identification information to the second processor through the target communication mode;
wherein the target communication mode includes at least one of: a first communication mode and a second communication mode; and
wherein the program, when running, controls the device to perform further operations of:
determining that the target communication mode is the first communication mode in response to the deployment relationship being that the first processor and the second processor are deployed on the same physical machine; and
determining that the target communication mode is the second communication mode in response to the deployment relationship being that the first processor and the second processor are deployed on different physical machines;
wherein the first communication mode is used for characterizing a communication mode in which communication is performed through a bus, and the second communication mode is used for characterizing a communication mode in which communication is performed through network.

16. The non-transitory storage medium according to claim 15, wherein the program, when running, controls the device to perform further operations of:
obtaining, by the first processor, a grouping result corresponding to the second processor, wherein the grouping result is obtained on the basis of grouping the second processor by a physical machine to which the second processor belongs; and
determining, by the first processor, the deployment relationship based on the grouping result corresponding to the second processor.

* * * * *